United States Patent
Tapia

(10) Patent No.: US 10,440,503 B2
(45) Date of Patent: Oct. 8, 2019

(54) MACHINE LEARNING-BASED GEOLOCATION AND HOTSPOT AREA IDENTIFICATION

(71) Applicant: TUPL, Inc., Snoqualmie, WA (US)

(72) Inventor: Pablo Tapia, Snoqualmie, WA (US)

(73) Assignee: TUPL, Inc., Bellevue, WA (US)

( * ) Notice: Subject to any disclaimer, the term of this patent is extended or adjusted under 35 U.S.C. 154(b) by 964 days.

(21) Appl. No.: 14/800,621

(22) Filed: Jul. 15, 2015

(65) Prior Publication Data

US 2016/0021503 A1    Jan. 21, 2016

Related U.S. Application Data

(60) Provisional application No. 62/025,447, filed on Jul. 16, 2014, provisional application No. 62/025,452, filed on Jul. 16, 2014.

(51) Int. Cl.
| | |
|---|---|
| *H04W 24/00* | (2009.01) |
| *H04W 4/021* | (2018.01) |
| *H04W 64/00* | (2009.01) |
| *H04W 24/02* | (2009.01) |
| *H04W 24/10* | (2009.01) |

(52) U.S. Cl.
CPC ........... *H04W 4/021* (2013.01); *H04W 24/02* (2013.01); *H04W 64/003* (2013.01); *H04W 24/10* (2013.01)

(58) Field of Classification Search
CPC . H04W 4/021; H04W 4/2402; H04W 64/003; H04W 24/10
See application file for complete search history.

(56) References Cited

U.S. PATENT DOCUMENTS

| | | | | |
|---|---|---|---|---|
| 2007/0010956 A1* | 1/2007 | Nerguizian | .......... | G01C 21/206 702/57 |
| 2007/0257838 A1* | 11/2007 | Cheng | .................... | G01S 19/05 342/357.42 |
| 2012/0198020 A1* | 8/2012 | Parker | .................. | H04W 12/08 709/217 |
| 2014/0011518 A1* | 1/2014 | Valaee | .................. | H04W 64/00 455/456.1 |
| 2014/0273911 A1* | 9/2014 | Dunn | ...................... | H04W 4/90 455/404.1 |
| 2015/0334576 A1* | 11/2015 | Sofman | ................. | H04W 16/18 455/456.1 |
| 2017/0235712 A1* | 8/2017 | Lanahan | ................. | G06T 11/60 715/731 |

* cited by examiner

*Primary Examiner* — Jinsong Hu
*Assistant Examiner* — Alexander J Yi

(57) ABSTRACT

Machine-learning based geolocation techniques may be used to provide the geolocations of user devices and determine the locations of hotspot areas. A coarse geolocation of a user device may be determined based on the wireless communication network usage information of the user device. Device data that includes the coarse geolocation of the use device may be inputted into a trained geolocation model of a machine learning algorithm. A refined geolocation of the user device that is more accurate than the coarse geolocation of the user device may be determined by using the machine learning algorithm to process the device data via the trained geolocation model. The refined geolocation of the user device may be further stored in a data store.

24 Claims, 5 Drawing Sheets

MACHINE LEARNING-BASED GEOLOCATION AND HOTSPOT AREA IDENTIFICATION

CROSS REFERENCE TO RELATED PATENT APPLICATIONS

This patent application claims priority to U.S. Provisional Application No. 62/025,447, entitled "Automatic Hotspot Identification for Cellular Networks", filed on Jul. 16, 2014, and to U.S. Provisional Application No. 62/025,452, entitled "A multistep Machine Learning Geolocation Procedure for Cellular Systems," filed on Jul. 16, 2014, which applications are hereby incorporated in their entirety by reference.

BACKGROUND

The analysis of data retrieved from multiple entities that are associated with wireless communication networks, such as network nodes and mobile devices, may involve pinpointing the geolocations of the mobile devices using the telecommunication networks. The geolocation data may be employed for a myriad of purposes, including data visualization, data analysis, and complex geographical analysis to understand the performances of mobile devices in specific locations. Geolocation tools may gather data from the multiple entities and perform intensive data processing to pinpoint the precise geolocations of the mobile devices. However, the intensive data processing may introduce a delay that prevents the utilization of the mobile device geolocations in real time, or otherwise provide poor estimations of the current geolocations of the mobile devices.

For example, wireless communication carriers have steadily upgraded their telecommunication networks by acquiring more spectrums and deploying ever more cell sites to cope with increased demands for network capacity. However, once spectral resources are depleted, sole reliance on the deployment of cell sites to increase additional network capacity may eventually result in high cell site densification, i.e., the deployment of a large number of cell sites in which each cell site provides a relatively small coverage area. For example, a coverage area radius of a cell site may at best range from tens to a few hundred meters. With such small cell site coverage sizes, locating a cell site in a strategic location that serves the most mobile devices is a key consideration. In other words, if the cell site is inaccurately deployed a few hundred meters away from an area with a high average concentration of mobile devices, the effectiveness of such cell site deployment may be significantly reduced. Thus, the effective deployment of cell sites may hinge on pinpointing the geolocations of mobile devices with the highest degree of accuracy.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
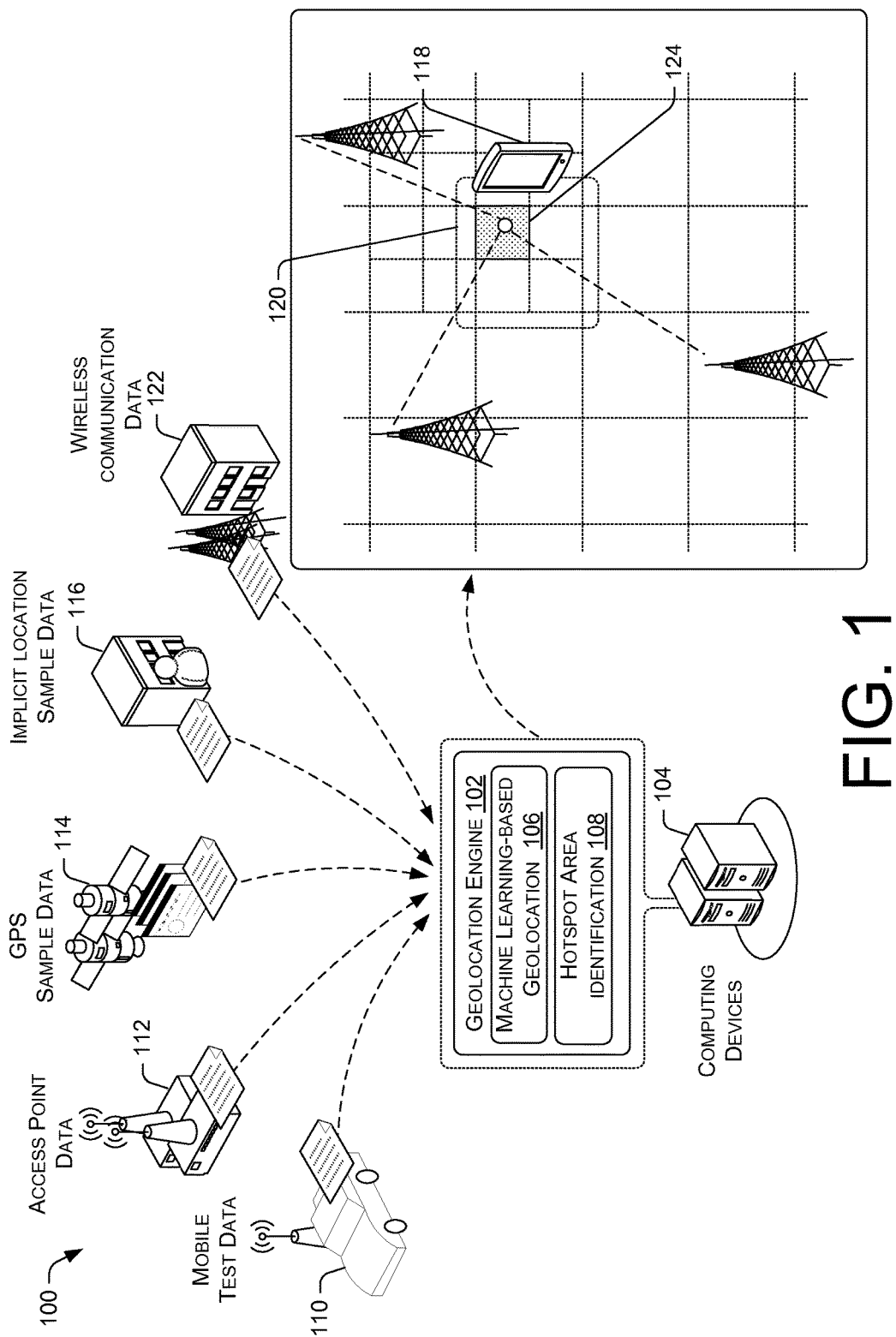
FIG. 1 illustrates an example network architecture for performing machine learning-based geolocation and hotspot area identification.

This disclosure is directed to techniques for using machine learning to determine the locations of user devices and identify with a high degree of precision hotspot areas where the user devices tend to aggregate. The user devices may use a wireless communication network to exchange voice and data communication with other user devices and network services. Thus, the aggregation of the user devices in certain vicinities may cause localized telecommunication traffic congestion for the wireless communication network. The identification of the hotspot areas may enable a wireless communication carrier that operates the wireless communication network to accurately deploy new network cells in the hotspots area to alleviate the localized telecommunication traffic congestion. For example, each network cell may be a macrocell, a picocell, a femtocell, or a microcell.

In various embodiments, the geolocation of a user device may be determined via machine learning that employs a trained geolocation model. The geolocation model may be trained using data sets with known device locations. For example, the training data sets may include mobile test data, Global Positioning System (GPS) data samples of user devices obtained from location based services and applications, cell trace data of user devices, user device Wi-Fi access point records, and/or other data sets with known locations. The geolocation may be further trained using data sets with implicit device locations. For example, a location of a user device belonging to a customer may be assumed to correspond to a billing address of the customer at a particular time, such as at nighttime.

Subsequently, machine learning may use the trained geolocation model to estimate the geolocation of a user device. For example, a classification algorithm may use the trained geolocation model to analyze data inputs relevant to a user device. Accordingly, the classification algorithm may classify the data inputs using the trained geolocation model to determine a geographical area that has the highest probability of corresponding to the geolocation of the user device. In alternative embodiments, an initial determination may be made as to whether a user device is indoors or outdoors. Subsequently, the geolocation of the user device may be further pinpointed using machine learning analysis of different types of input data relevant to a user device, in which the different types of input data are selected based on the initial determination.

In other embodiments, the geolocations of multiple user devices that are pinpointed via machine learning may be used to identify hotspot area where user devices tend to aggregate. Such identification of the hotspot areas may lead to the deployment of additional network cells to alleviate the localized telecommunication traffic congestion in those areas. In some instances, machine learning may also be used to predict new hotspot areas based on existing user device geolocation patterns and network traffic loads. In this way, future localized telecommunication traffic congestions may be prevented or reduced before such congestions actually occur.

The techniques for employing machine learning to pinpoint the locations of user devices may provide more accurate user device geolocations than conventional geolocation practices used by wireless communication carriers. Further, through the use of machine learning to pinpoint the location of a user device as described in the embodiments, the computation of the location may be achieved quicker and in a more simplistic manner than using other conventional geolocation algorithms. As cell sites become more densified over time in order to meet capacity demands, the ability to obtain highly accurate user device geolocations quickly may lead to precise identification of hotspot areas. In turn, the precise identification of hotspot areas may result in more effective deployment of new network cells that alleviate localized telecommunication traffic congestions. Thus, the techniques may reduce customer service support call volumes, increase customer satisfaction and retention, and generate higher revenue for wireless communication carriers. The techniques described herein may be implemented in a number of ways. Example implementations are provided below with reference to the following figures.

Example Network Architecture

FIG. 1 illustrates an example architecture 100 for performing machine learning-based geolocation and hotspot area identification. The architecture 100 may include a geolocation engine 102. The geolocation engine 102 may execute on one or more computing devices 104. The computing devices 104 may include general purpose computers, such as desktop computers, tablet computers, laptop computers, servers, and so forth. However, in other embodiments, the computing devices 104 may include smart phones, game consoles, or other electronic devices that are capable of receive inputs, process the inputs, and generate output data. In various the embodiments, the computing devices 104 may be operated by a wireless communication carrier or a third-party entity that is working with the wireless communication carrier.

The geolocation engine 102 may perform machine learning-based geolocation 106 and hotspot area identification 108. In machine-learning based geolocation 106, the geolocation engine 102 may employ a trained geolocation model to determine the geolocation of user devices. The geolocation model may be trained using data sets with known device locations. For example, the training data sets may include mobile test data 110, access point data 112, GPS sample data 114, implicit location sample data 116, and/or other data sets with device location information.

The mobile test data 110 may include signal characteristics of telecommunication signals provided by a wireless communication carrier at known geolocations. Each signal characteristic may be measured by mobile measuring equipment at each known geolocation. Each signal characteristic may be a signal strength or a signal quality. Signal strength may be measured via received signal strength indicator (RSSI), reference signal received power (RSRP), received channel power indicator (RCPI), or other measurements. Signal quality may be measured through energy to interface ratio (ECIO), reference signal received quality (RSRQ), signal to interference-plus-noise ratio (SINR), or other measurements. In some instances, the signal characteristics may be from predetermined sample times at the same or similar geolocations. For example, signal characteristics of a network cell may be obtained for various times of a day and for various days throughout a year at the same or similar geolocations.

The access point data 112 may include the identification information of Wi-Fi access points and their geolocations. The identification information may include Internet Protocol (IP) addresses, Media Access Control (MAC) addresses, model/manufacturer information, and/or other information that uniquely identify and/or locates each Wi-Fi access points. The access point data 112 may further include the signal characteristics of communication signals produced by user devices and received by the Wi-Fi access points. Once again, each signal characteristic may be a signal strength or a signal quality. Further, the signal characteristics may be from predetermined sample times at the same or similar geolocations.

The GPS sample data 114 may include data collected by location-based services contacted by the user devices. For example, a location-based service may be an Enhanced 911 (E911) service that is offered by a local government entity. The GPS sample data 114 may also include data collected by location-aware applications that reside on the user devices. For example, a location-aware application may be an application that provides online reviews of retailers and eateries based on a geolocation of a user device. The GPS sample data 114 may include geolocation of the user devices as pinpointed by GPS receivers of the user devices for the location-based services. The GPS sample data 114 may further include location identification information of services and/or network servers that are contacted by the user devices, such as IP addresses, MAC addresses. Additionally, the GPS sample data 114 may further include residential or commercial addresses that are supplied by the location-aware applications that reside on the user devices, and/or so forth. For example, the location-aware application may automatically correlate a GPS determined geolocation with a commercial address of a business. The GPS sample data 114 may further include the signal characteristics of communication signals received and/or generated by the user devices at various ascertained locations of the user devices. Once again, each signal characteristic may be a signal strength or a signal quality. Further, the signal characteristics may be from predetermined sample times at the same or similar geolocations.

The implicit location sample data 116 may include indirectly derived locations of user devices. For example, the user device belonging to a customer may be assumed to have a location that correspond to a billing address of the customer at a particular time, such as at nighttime. Such an assumption may be made when no information regarding the geolocation of the user device is available for a predetermined amount of time Implicit location sample data that is collected for a user device belonging to a customer within a predetermined vicinity of a billing address of the customer may be assumed to be collected at a particular time of the day, such as evening or night time. The implicit location sample data 116 may further include the signal characteristics of telecommunication signals received and/or generated by the user devices at various ascertained locations of the user devices. Once again, each signal characteristic may be a signal strength or a signal quality. Further, the signal characteristics may be from predetermined sample times at the same or similar geolocations.

Subsequently, the geolocation engine 102 may use the trained geolocation model to perform machine learning-based geolocation 106 and estimate the geolocation of a user device. In one scenario, the geolocation engine 102 may use the trained geolocation model and a classification algorithm to classify the data inputs that are relevant for a user device. Such data inputs may include time of the day, one or more signal characteristics (e.g., signal strength, signal quality, etc.) of the telecommunication signal from the user device received by a network cell, interference to the network cell from nearby network cells, location of the network cell, and/or so forth. Accordingly, the classification algorithm may calculate a probability that the user device is located in each of multiple geographical areas. Following the calculation of the probabilities, the geolocation engine 102 may select a geographical area with a highest probability as the geolocation of the user device. For example, the geolocation engine 102 may determine that the user device 118 is in geographical area 120 because the calculated probability for geographical area 120 is the highest.

In alternative embodiments, the geolocation engine 102 may make an initial determination as to whether a user device is indoors or outdoors. This initial determination may include a preliminary geolocation of the user device. Following the initial determination, the geolocation of the user device may be further pinpointed using machine learning analysis of different types of data. The different types of data may be processed by a machine learning algorithm depending on whether the user device is indoors or outdoors. For example, in the instance in which the user device is outdoors, the geolocation engine 102 may use data inputs such as time of the day, one or more signal characteristics (e.g., signal strength, signal quality, etc.) of the telecommunication signal from the user device received by a network cell, interference to the network cell from nearby network cells, to determine the geolocation of the user device.

However, in the instance in which the user device is indoors, the geolocation engine 102 may alternatively or concurrently use information from one or more Wi-Fi access points that are within a predetermined distance of the preliminary geolocation of user device. The information from a Wi-Fi access point may indicate Wi-Fi connectivity activities of the user device. The indication of the Wi-Fi connectivity may further include signal characteristics of a communication signal received from the user device. Thus, the geolocation engine 102 may deduce the geolocation of the indoor user device at least partially based on the known locations of the Wi-Fi access points and information on the user device from the one or more Wi-Fi access points.

In hotspot area identification 108, the geolocations of multiple user devices that are pinpointed via machine learning may be used to identify hotspot area where user devices tend to aggregate. The geolocation of the multiple user devices is processed along with wireless communication data 122. The wireless communication data 122 may include Operation Support System (OSS) reports, Radio Frequency (RF) planning information, cell trace data, and IP network performance metrics. The RF planning information of a wireless communication network may indicate assigned frequencies, network cell locations, wireless communication implementation parameters for providing telecommunication coverage and capacity. The cell trace data may indicate network cells of a wireless communication network that are currently communicating or most recently communicating with user devices. The IP network performance metrics of a wireless telecommunication network may measure network traffic levels or load levels in relation to total network capacity.

Accordingly, the geolocation engine 102 may identify hotspot areas where additional network cells may be deployed to alleviate localized telecommunication congestion. For example, the geolocation engine 102 may identify the hotspot area 124 for the installation of a new network cell. In other instances, the geolocation engine 102 may use machine learning to predict new hotspot areas based on existing user device geolocation patterns. In this way, the geolocation engine 102 may prevent or reduce future localized telecommunication traffic congestions.

Example Computing Device Components

Figure 2:
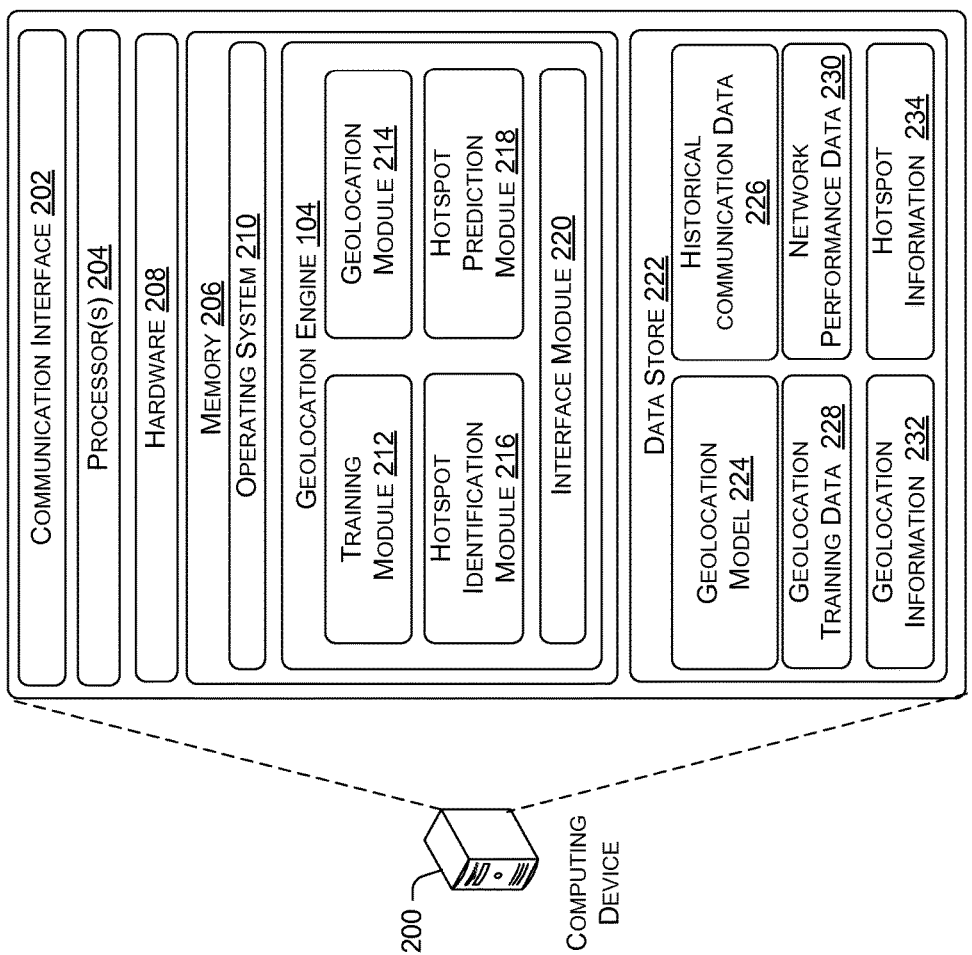
FIG. 2 is a block diagram showing various components of an illustrative computing device that implements machine learning-based geolocation and hotspot area identification.

FIG. 2 is a block diagram showing various components of an illustrative computing device 200 that implements machine learning-based geolocation and hotspot area identification. The computing device 200 may include a communication interface 202, one or more processors 204, memory 206, and hardware 208. The communication interface 202 may include wireless and/or wired communication components that enable the server to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing device 200 may implement an operating system 210 and the geolocation engine 102. The operating system 210 may include components that enable the computing device 200 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The geolocation engine 102 may include a training module 212, a geolocation module 214, a hotspot identification module 216, a hotspot prediction module 218, and an interface module 220. The modules may include routines, program instructions, objects, and/or data structures that perform particular tasks or implement certain abstract data types. The memory 206 may also include a data store 222 that stores a geolocation model 224. The training module 212 may training the geolocation model 224 using various sample data. The sample data may include the mobile test data 110, the access point data 112, the GPS sample data 114, the implicit location sample data 116, and/or other sample data. The training module 212 may receive the sample data from multiple sources. For example, the training module 212 may receive training data from entities such as a Serving Mobile Location Center (SMLC), an Access Network Discovery and Selection Function (ANDSF), a Hotspot 2.0 (HS2.0) server, a cell trace function, a telecommunication network performance metric collection server, and/or other sources. The training module 212 may train the geolocation model 224 for use with various machine learning algorithms that perform data analysis, such as supervised learning, unsupervised learning, semi-supervised learning, naïve Bayes, Bayesian networks, decision trees, neural networks, fuzzy logic, and/or probabilistic classification algorithms.

The geolocation module 214 may implement the machine learning algorithms that use the geolocation model 224 to determine the geolocation of each user device based on the input data that are associated with each user device. For example, the geolocation module 214 may receive data inputs such as time of the day, one or more signal characteristics (e.g., signal strength, signal quality, etc.) of the telecommunication signal from the user device received by a network cell, interference to the network cell from nearby network cells, location of the network cell, and/or so forth. In turn, the geolocation model 224 may process the data inputs using the geolocation model 224 to calculate a probability that the user device is located in each of multiple geographical areas. Following the calculation of the probabilities, the geolocation model 224 may select a geographical area with a highest probability as the geolocation of the user device.

In some embodiments, the geolocation module 214 may perform a coarse geolocation of a user device based on network usage information. The network usage information may indicate a network cell of a wireless communication network that is currently communicating or most recently communicating with the user device. Accordingly, because the location of the cell site is known, the geolocation module 214 may infer that the user device is in a general vicinity that is covered by the network cell. Such coarse geolocation of a user device may be obtained in real-time or near real-time with minimal using of processing resources. In at least one embodiment, the coarse geolocation of the user device may be used as a data input for the geolocation model to determine a further refined geolocation of the user device.

In alternative embodiments, the geolocation module 214 may make an initial determination as to a preliminary geolocation of the user device, and an assessment of whether a user device is indoors or outdoors. The determination may be made based on data inputs associated with the user device, such as signal characteristics, cell site-to-cell interference readings, absence or presence of access point connectivity activities, and/or so forth. For example, a signal strength or signal quality of a telecommunication signal received from a user device that is below a corresponding threshold may contribute to the geolocation module 214 determining that the user device is indoors. A frequency of a switch over between two cell sites by the user device that is higher than a predetermined switch over frequency threshold may also contribute to a determination that the user device is indoors. In another example, the presence of access point connectivity by the user device in a recent time period that lasts for than a predetermined time interval may likewise contribute to a determination that the user device is indoors.

In some embodiments, the geolocation module 214 may feed the data inputs may be into the geolocation model 224 for analysis. A machine learning algorithm may use the geolocation model 224 to analyze the data inputs to determine whether the user device is indoors or outdoors, as well as generate a preliminary geolocation of the user device. For example, the machine learning algorithm may provide a first probability of the user device being indoors and a second probability of the user device being outdoors, and the higher of the two probabilities is used by the geolocation module 214 as an indication of whether the user device is indoors or outdoors.

Once the initial determination is complete, the geolocation module 214 may use different techniques to further refine the geolocation of the user device. The techniques used may depend on whether the user device is initially assessed as being indoors or outdoors. For example, in the instance in which the user device is outdoors, the geolocation module 214 may input data such as time of the day, one or more signal characteristics (e.g., signal strength, signal quality, etc.) of the telecommunication signal from the user device received by a network cell, interference to the network cell from nearby network cells into the geolocation model 224. In turn, the geolocation model 224 may provide a determination of a refined geolocation of the user device.

However, in the instance in which the user device is indoors, the geolocation module 214 may alternatively or concurrently use information from one or more Wi-Fi access points that are within a predetermined distance of the preliminary geolocation of user device. The information from a Wi-Fi access point may indicate Wi-Fi connectivity activities of the user device. The indication of the Wi-Fi connectivity may further include signal characteristics of a communication signal received from the user device. The geolocation engine 102 may feed such data inputs into the geolocation model 224. Thus, with the use of the geolocation model 224, the geolocation engine 102 may deduce the refined geolocation of the user device at least partially based on the known locations of the Wi-Fi access points and information on the user device from the one or more Wi-Fi access points.

The hotspot identification module 216 may identify hotspot area with relatively high aggregation of user device that are using a wireless communication network. The hotspot identification module 216 may monitor the network performance of the wireless communication network via wireless communication data, such as wireless communication data 122, received from the network. The wireless communication data may include OSS reports, RF planning information, cell trace data, and IP network performance metrics. The hotspot identification module 216 may archive past wireless communication data as a part of the historical communication data 226 in the data store 222. The historical communication data 226 may include external contextual information, such as information on weather patterns, traffic data, public events, sports events, news events, and/or so forth.

In one scenario, the hotspot identification module 216 may detect a network traffic congestion in a portion of the wireless communication network based on the wireless communication data. Subsequently, the hotspot identification module 216 may compare the current wireless communication data to the historical communication data 226. Based on the comparison, the hotspot identification module 216 may determine whether the network traffic congestion is a transient congestion or a non-transient congestion based on historical traffic patterns. For example, a wireless communication traffic congestion event in a particular geographical area may correlate with a recurring annual sporting event. Accordingly, the hotspot identification module 216 may classify such a wireless communication traffic congestion event as a transient traffic congestion. In another example, the hotspot identification module 216 may determine that a pattern of recurring wireless communication traffic congestion events do not correlate with any events that are indicated by contextual information. In such an example, the hotspot identification module 216 may classify the wireless communication traffic congestion events as a sign of a non-transient traffic congestion.

In some embodiments, the discovery of a non-transient traffic congestion in a geographical location may lead the hotspot identification module 216 to perform further analysis. The analysis may enable the hotspot identification module 216 to eliminate network infrastructure causes of the non-transient traffic congestion. The network infrastructure causes may include an equipment failure, radio signal interference, a hardware configuration error, or a software configuration error that affect the wireless communication network. For example, a problem with a backhaul of a network cell may reduce the volume of backhaul traffic between the network cell and a core network of a wireless communication network. In another example, radio signal interference between the network cell and another radio transceiver may cause a reduction in radio traffic capacity of the network cell. The hotspot identification module 216 may perform the analysis based on wireless communication data that includes radio signal characteristics reports, backhaul traffic reports, and/or other relevant data pertaining to network cells. In some instances, the hotspot identification module 216 may report the network infrastructure causes of non-transient traffic congestions to the relevant engineering entity at a wireless communication carrier.

However, if the hotspot identification module 216 determines that a non-transient traffic congestion is not due to a network infrastructure cause, the hotspot identification module 216 may ascertain one or more hotspot areas to deploy additional network cells. Each of the additional network cells may be a macrocell, a picocell, a femtocell, or a microcell. In various embodiments, the hotspot identification module 216 may use the geolocation module 214 to determine an aggregate of user devices in a geographical area that are affected by the non-transient traffic congestion.

Once the clustering of the user devices in the geographical area is determined, the hotspot identification module 216 may determine a new hotspot area for the deployment of a network cell. In various embodiments, the new hotspot area may be determined via a clustering algorithm, such as a k-mean clustering algorithm or an expectation-maximization (EM) algorithm, which centers the network hotspot area on the cluster of the user devices. The new hotspot area may be completed enclosed in the affected geographical area or at least partially overlap with the affected geographical area. Further, the new hotspot area may be an indoor hotspot area or an outdoor hotspot area.

Following the creation of the new hotspot area, the hotspot identification module 216 may assess whether an amount of telecommunication traffic congestion that is offloaded from an existing cell in the affected geographical area to a network cell in the new hotspot area meets a predetermined offload threshold. In some embodiments, the hotspot identification module 216 may run a computer modeling simulation based on the historical communication data for the affected geographical area and the new hotspot area to determine whether the predetermined offload threshold is met. In other embodiments, the hotspot identification module 216 may make the determination based on actual field data that is collected by the wireless communication network following a temporary deployment of a temporary network cell to the new hotspot area.

Thus, in the event that the predetermined offload threshold is not met, the hotspot identification module 216 may adjust one or more boundaries of the new hotspot area and the creation of the one or more additional hotspot areas. For example, at least one boundary of the new hotspot area may be adjusted to shrink the new hotspot area to increase cell density, to mitigate for an impact of terrain features that adversely affect radio signals outputted by a network cell in the new hotspot area, or to reduce radio signal interference with one or more existing network cells or other transceivers in the same vicinity.

Each of the additional hotspot area may be created to replace a portion of the hotspot area as existed prior to the adjustment or at least partially overlap with the hotspot area as existed prior to the adjustment. The adjustment and creation may be followed by another assessment of whether the amount of telecommunication traffic congestion that is offloaded meets a predetermined offload threshold. In some embodiments, the predetermined offload threshold may also be adjusted to compensate (e.g., increased or decreased) for the adjustment to the hotspot area. Thus, if the predetermined offload threshold is not met, the hotspot identification module 216 may perform further hotspot area adjustments and hotspot area creation. In this way, the hotspot identification module 216 may iteratively perform adjustment and creation until the predetermined offload threshold is met.

In some embodiments, the hotspot identification module 216 may perform an interference check following the identification of a new hotspot area to deploy a new network cell. The interference check may ensure that the deployment of the new network cell does not create RF interference with one or more existing network cells. For example, the placement of a new network cell within a predetermine distance threshold of an existing network cell may cause the signals of these network cells to mutually interfere with each other. Accordingly, the hotspot identification module 216 may query an engineering database, such as the data store 222, which stores the locations of the existing network cells. Thus, if the hotspot identification module 216 determines that a new network cell is within a predetermined distance of an existing network cell, the hotspot identification module 216 may further adjust one or more boundaries of the new hotspot area in the same manner as if a predetermined offload threshold associated with the new hotspot area is not met. The boundary adjustments may result in the creation of one or more additional new hotspot areas. The hotspot identification module 216 may iteratively repeat the interference checks and/or boundary adjustments for one or more new hotspot areas until RF interference between network cells is resolved, i.e., the RF interference is eliminated or is reduced to an acceptable level. The acceptable level may be determine based on an acceptable data packet loss rate for each network cell, an acceptable signal quality metric for the signal of each network cell, or some other predetermined measurement metric for RF interference.

The hotspot prediction module 218 may use a machine learning function to predict when a new hotspot area is to be implemented to prevent future network traffic congestion. In various embodiments, the machine learning function may take into account short-term and/or long-term network traffic load and traffic distribution trends in different geographical areas, as projected based on the geolocations of the user devices. External contextual information such as population growth, economic indexes, employment figures, traffic patterns, and/or so forth, may also be analyzed by the machine learning function. Accordingly, by using neural networks, support vector machines, robust regression, k-nearest neighbor, naïve Bayes, and/or other predictive modeling algorithms, the hotspot prediction module 218 may predict new hotspot areas. In some embodiments, following the prediction of a new hotspot area, the hotspot prediction module 218 may call upon the hotspot identification module 216 to perform interference checks, boundary adjustments for the new hotspot area, and/or additional new hotspot creation until RF interference between a network cell of the new hotspot area and one or more existing network cells is resolved, i.e., the RF interference is eliminated or is reduced to an acceptable level.

The interface module 220 may enable the geolocation engine 102 to receive inputs and route outputs to applications. For example, the interface module 220 may enable an administrator to select the type training data that are used by the training module 212. The interface module 220 may also display the geolocations of the user devices, the identified hotspot areas, and/or the predicted hotspot area via a user interface display.

The data store 222 may store the geolocation model 224 and the historical communication data 226. The data store 222 may also store the geolocation training data 228 and the network performance data 230. The geolocation training data 228 may include the mobile test data 110, the access point data 112, the GPS sample data 114, and the implicit location sample data 116. The network performance data 230 may include information that reveal network traffic and congestions in different geographical locations. The geolocation information 220 as stored in the data store 222 include user device geolocation information that is generated by the geolocation module 214. The data store 222 may also store hotspot information 234. The hotspot information 234 may include identification information of hotspot areas that are determined by the hotspot identification module 216 and/or the hotspot prediction module 218. The identification information for a hotspot area may include GPS coordinates, boundary descriptions, map overlays, associated network cell type, and/or so forth.

Example Processes

Figure 3:
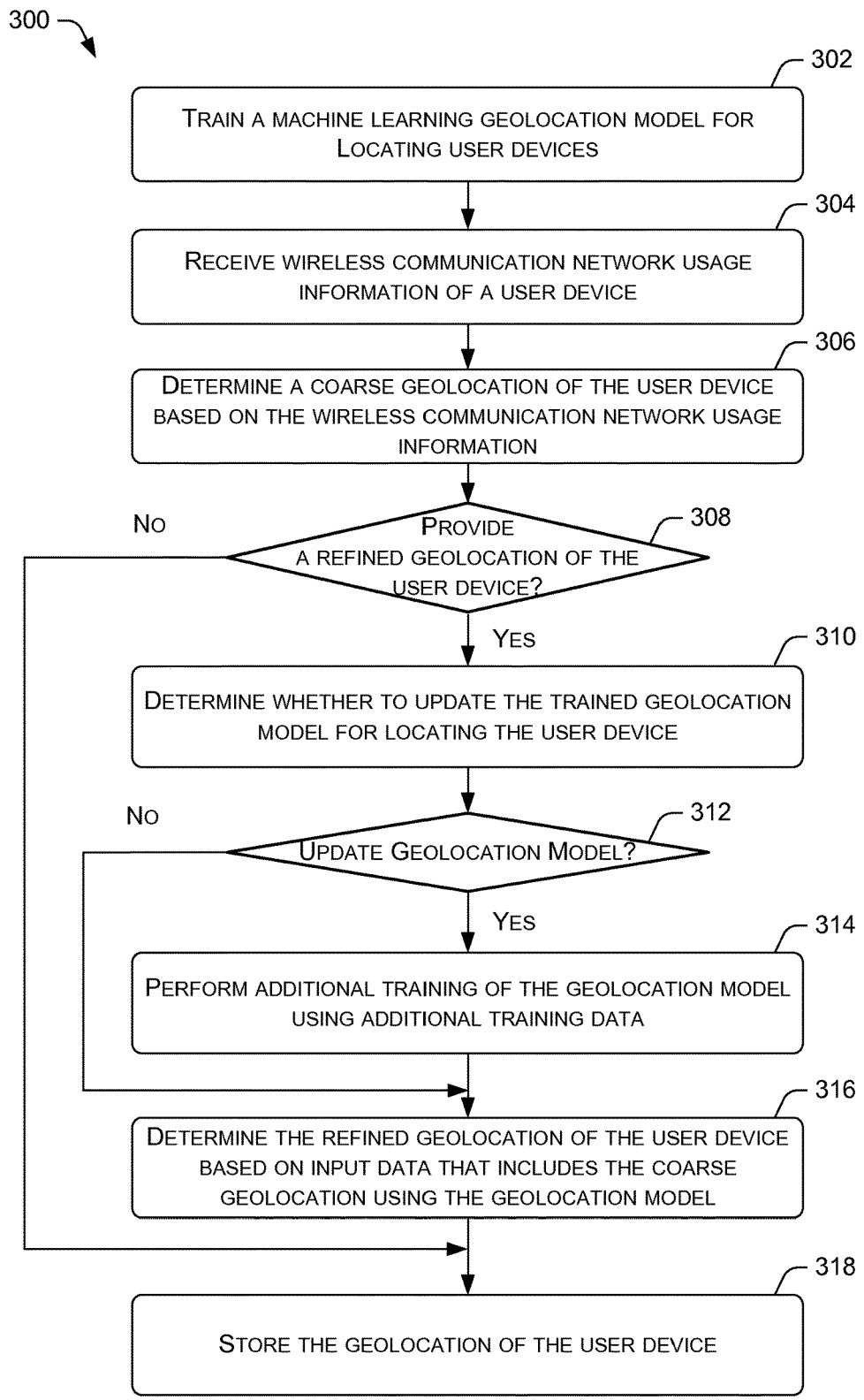
FIG. 3 is a flow diagram of an example process for using a machine learning geolocation model to determine a geolocation of a user device.
Figure 4:
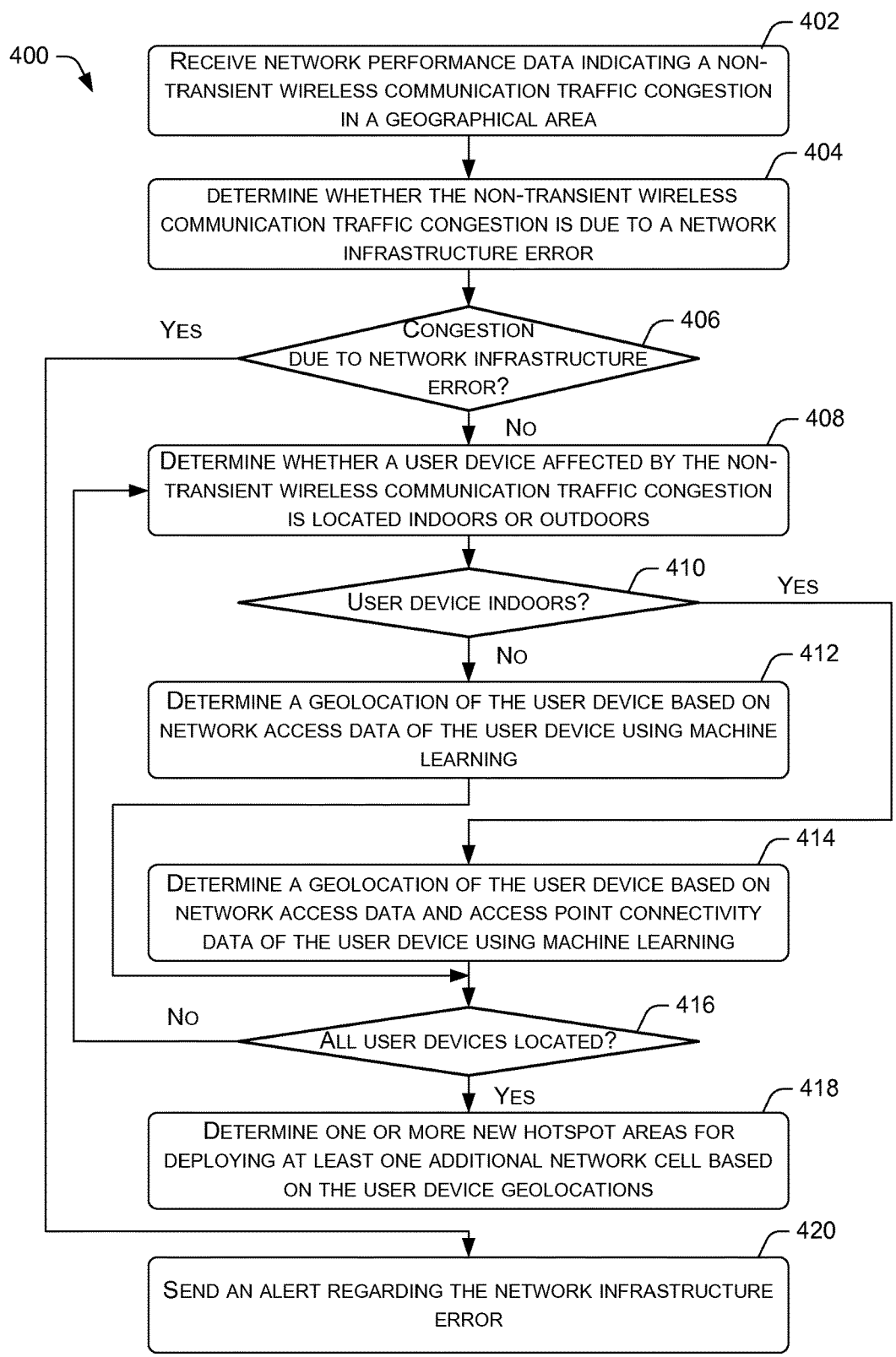
FIG. 4 is a flow diagram of an example process for using machine learning to assist in the determination of user device locations that contribute to the identification of hotspot areas.
Figure 5:
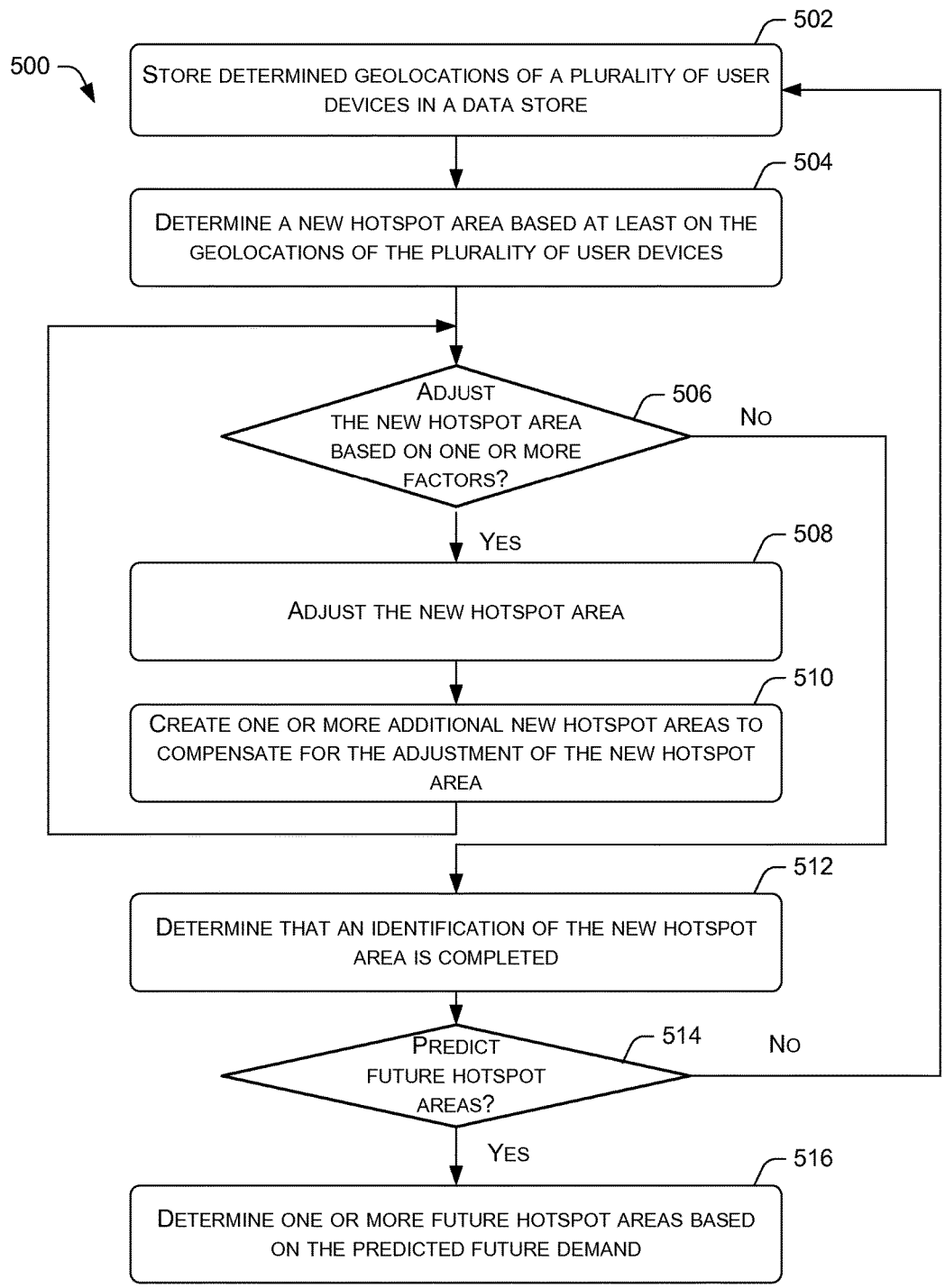
FIG. 5 is a flow diagram of an example process for identifying and adjusting hotspot areas based on the locations of user devices.

FIGS. 3-5 present illustrative processes 300-500 for providing machine-learning based geolocation and hotspot identification. Each of the processes 300-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-500 are described with reference to the architecture 100 of FIG. 1.

FIG. 3 is a flow diagram of an example process 300 for using a machine learning geolocation model to determine a geolocation of a user device. At block 302, the geolocation engine 102 may train a machine learning geolocation model, such as the geolocation model 224, for locating user devices. The geolocation model may be trained using geolocation training data that includes mobile test data 110, access point data 112, GPS sample data 114, implicit location sample data 116, and/or other data that includes device-related characteristics and location information.

At block 304, the geolocation engine 102 may receive wireless communication network usage information of a user device, such as the user device 118. The wireless communication network usage information may include cell trace data. The cell trace data may indicate a network cell of a wireless communication network that is currently communicating or most recently communicating with the user device.

At block 306, the geolocation engine 102 may determine a coarse geolocation of the user device based on the wireless communication network usage information. For example, because the location of the cell site that currently or recently communicating with the user device is known, the geolocation module 214 may infer that the user device is in a general vicinity that is covered by the network cell. Such coarse geolocation of a user device may be obtained in real-time or near real-time with minimal using of processing resources.

At decision block 308, the geolocation engine 102 may determine whether to provide a refined geolocation of the user device. The geolocation engine 102 may make such a determination based on a user input or a computer instruction, such as an instruction to identify a hotspot area. Thus, if the geolocation engine 102 determines that a refined geolocation of the user device is to be provided ("yes" at decision block 308), the process 300 may proceed to block 310.

At block 310, the geolocation engine 102 may determine whether to update the geolocation model that is used to refine the geolocation of the user device. The determination may be made based on an input from a user.

Alternatively, the geolocation engine 102 may make the determination based on whether additional training data is available and/or whether a predetermined amount of time has passed. For example, the geolocation engine 102 may determine that the geolocation model is to be updated when a sufficient quantity of additional training data is available and a predetermined amount of time has passed. Thus, at decision block 312, if the geolocation engine 102 determines that the geolocation model is to be updated ("yes" at decision block 312), the process 300 may proceed to block 314.

At block 314, the geolocation engine 102 may perform additional training of the geolocation model using the additional training data. In various embodiments, the additional training data may include additional mobile test data, additional access point data, additional GPS sample data, additional implicit location sample data, and/or other additional training data.

At block 316, the geolocation engine 102 may determine the refined geolocation of the user device based on the geolocation model. In various embodiments, the refined geolocation of the user device may be determined via the classification or categorization of a set of data inputs via the geolocation model. In some embodiments, the set of data inputs may include a coarse geolocation of the user device that is obtained at the block 306. In turn, the classification or categorization of the data inputs may generate the refined geolocation of the user device. At block 318, the geolocation engine 102 may store the refined geolocation of the user device in the data store 222.

Returning to decision block 308, if the geolocation engine 102 determines that no refined geolocation of the user device is to be provided ("no" at decision block 308), the process 300 may proceed directly to block 318. At block 318, the geolocation engine 102 may store the coarse geolocation of the user device in the data store 222.

Returning to decision block 312, if the geolocation engine 102 determines that no update of the geolocation model is to occur ("no" at decision block 312), the process 300 may proceed directly to block 316. At block 316, the geolocation engine 102 may determine the refined geolocation of the user device based on the geolocation model.

FIG. 4 is a flow diagram of an example process 400 for using machine learning to assist in the determination of user device locations that contribute to the identification of hotspot areas. At block 402, the geolocation engine 102 may receive network performance data from a wireless communication network. The network performance data may indicate a non-transient wireless communication traffic congestion in a geographical area. For example, the geolocation engine 102 may analyze the characteristics of a wireless communication traffic congestion. In such an example, the geolocation engine 102 may determine that the characteristics and context of the wireless communication traffic congestion do not correlate with characteristics and context of any known historical transient traffic congestion events. Accordingly, the geolocation engine 102 may classify the wireless communication traffic congestion as a non-transient traffic congestion.

At decision block 404, the geolocation engine 102 may analyze the network performance data to determine whether the non-transient wireless communication traffic congestion is due to a network infrastructure error. In various embodiments, the network infrastructure causes of error may include an equipment failure, radio signal interference, a hardware configuration error, or a software configuration error that affects the wireless communication network. At decision block 406, if the geolocation engine 102 determines that the non-transient wireless communication traffic congestion is not due to a network infrastructure error ("no" at decision block 406), the process 400 may proceed to block 408.

At block 408, the geolocation engine 102 may determine whether a user device affected by the non-transient wireless communication traffic congestion is located indoors or outdoors. In various embodiments, the geolocation engine 102 may make such a determination based on data inputs associated with the user device, such as signal characteristics, cell site-to-cell interference readings, absence or presence of access point connectivity activities, and/or so forth. Thus, at decision block 410, if the geolocation engine 102 determines that the user device is not indoors ("no" at decision block 410), the process 400 may proceed to block 412.

At block 412, the geolocation engine 102 may use a machine learning algorithm to determine a location of the user device based on the network access data of the user device using machine learning. In various embodiments, the network access data may include information such as time of the day, one or more signal characteristics (e.g., signal strength, signal quality, etc.) of the telecommunication signal from the user device received by a network cell, interference to the network cell from nearby network cells, location of the network cell, and/or so forth. The geolocation engine 102 may feed the network access data into a geolocation model associated with the machine learning algorithm, such as the geolocation model 224. In turn, the analysis of the input data using the geolocation model may provide an estimate as to the geolocation of the user device.

However, at decision block 410, if the geolocation engine 102 determines that the user device is indoors ("yes" at decision block 410), the process 400 may proceed to block 414. At block 414, the geolocation engine 102 may use a machine learning algorithm to determine a location of the user device based on the network access data and access point connectivity data of the user device using machine learning. In various embodiments, the network access data may include information such as time of the day, one or more signal characteristics (e.g., signal strength, signal quality, etc.) of the telecommunication signal from the user device that is received by a network cell, interference to the network cell from nearby network cells, location of the network cell, and/or so forth. The access point connectivity data may provide information such as connectivity date and time, one or more signal characteristics (e.g., signal strength, signal quality, etc.) of the communication signal received by the access point from the user device, a location of the access point, and/or so forth. The geolocation engine 102 may feed the network access data and the access point connectivity data into a geolocation model associated with the machine learning algorithm, such as the geolocation model 224. In turn, the analysis of the input data via the geolocation model may provide an estimate as to the geolocation of the user device.

At decision block 416, the geolocation engine 102 may determine whether all user devices that are affected by the non-transient wireless communication traffic congestion in the geographical area are located. Accordingly, if the geolocation engine 102 determines that not all of the user devices are located, the process 400 may loop back to block 408. At block 408, the geolocation engine 102 may initiate the geolocation determination for another user device that is affected by the non-transient wireless communication traffic congestion. However, if the geolocation engine 102 determines that all of the user devices are located ("yes" at decision block 416), the process 400 may proceed to block 418.

At block 418, the geolocation engine 102 may determine one or more new hotspot areas for deploying at least one network cell. The geolocation engine 102 may perform the determination based on the geolocation of the user devices that are affected by the non-transient wireless communication traffic congestion in the geographical area.

Returning to decision block 406, if the geolocation engine 102 determines that the non-transient wireless communication traffic congestion is due to a network infrastructure error ("yes" at decision block 406), the process 400 may proceed to block 420. At block 420, the geolocation engine 102 may send an automated alert regarding the network infrastructure error. The alert may be routed to a customer care application or a network performance monitoring application of a wireless communication network.

In some embodiments, the procedure for obtaining a geolocation of a user device as described in the process 400 may be substitute with the procedure for obtaining the refined geolocation of a user device as described in the process 300. In some instances, such a substitution may decrease an amount of time used to identify a hotspot area. Further, the geolocation model as used in the process 400 may be updated as described in block 314 of the process 300 prior to any of the geolocation analysis by the machine learning algorithm of the geolocation engine 102.

FIG. 5 is a flow diagram of an example process 500 for identifying and adjusting hotspot areas based on the locations of user devices. The example process 500 may further illustrate block 418 of the process 400. At block 502, the geolocation engine 102 may store determined geolocations of a plurality of user devices in a data store. The geolocation may be determined via machine learning using a geolocation model. For example, the geolocations may be stored as geolocation information 232 in the data store 222.

At block 504, the geolocation engine 102 may determine a new hotspot area based at least on the geolocation of the plurality of user devices. In various embodiments, the new hotspot area may be determined via a clustering algorithm that centers the network hotspot area on a cluster of the user devices. The new hotspot area may be completed enclosed in the affected geographical area or at least partially overlap with the affected geographical area. Further, the new hotspot area may be an indoor hotspot area or an outdoor hotspot area.

At block 506, the geolocation engine 102 may determine whether to adjust the new hotspot area based on one or more factors. The geolocation engine 102 may make the determination based on whether wireless communication traffic congestion offload to the new hotspot area meets a predetermined offload threshold. In some instances, the geolocation engine 102 may run a computer modeling simulation based on the historical communication data for the affected geographical area and the new hotspot area to determine whether the predetermined offload threshold is met. In other instances, the geolocation engine 102 may make the determination based on actual field data that is collected by the wireless communication network following a temporary deployment of a network cell to the new hotspot area.

Alternatively or concurrently, the geolocation engine 102 may make the determination based on whether there is RF interference between a new network cell of the new hotspot area and an existing network cell. Accordingly, in some embodiments, the geolocation engine 102 may adjust the new hotspot area if the offload threshold is not met. In other embodiments, the geolocation engine 102 may adjust the new hotspot area if there is RF interference between a new network cell of the new hotspot area and an existing network cell. In still other embodiments, the geolocation engine 102 may adjust the new hotspot area if at least one of these two conditions (i.e., failure to meet offload threshold, RF interference exists) occurs. Thus, at decision block 506, if the geolocation engine 102 determines that the new hotspot area is to be adjusted ("yes" at decision block 506), the process 500 may proceed to block 508.

At block 508, the geolocation engine 102 may adjust the new hotspot area. In various embodiments, one or more boundaries of the new hotspot area may be adjusted. For example, at least one boundary of the new hotspot area may be adjusted to shrink the new hotspot area to increase cell density, to mitigate for an impact of terrain features that adversely affect radio signals outputted by a network cell in the new hotspot area. Alternatively, at least one boundary of the new hotspot area may be adjusted to reduce or eliminate radio signal interference with one or more existing network cells in the same vicinity following the performance of an interference check.

At block 510, the geolocation engine 102 may create one or more additional new hotspot areas to compensate for the adjustment of the new hotspot area. Each of the additional new hotspot area may be created to replace a portion of the new hotspot area as existed prior to the adjustment or at least partially overlap with the hotspot area as existed prior to the adjustment. Subsequently, the process 500 may loop back to block 506 so that the geolocation engine 102 may determine whether wireless communication traffic congestion offload to the new hotspot area as adjusted meets a predetermined offload threshold. In some embodiments, the predetermined offload threshold may be identical to the previous predetermined offload threshold.

In other embodiments, the predetermined offload threshold may also be adjusted (e.g., increased or decreased) to compensate for the adjustment to the new hotspot area. In various embodiments, the geolocation engine 102 may also determine whether the wireless communication traffic congestion offload to each of the additional new hotspot area meets a predetermined offload threshold, and if applicable, perform adjustment of each additional new hotspot area and/or further hotspot area creation in an iterative manner.

Returning to decision block 506, if the geolocation engine 102 determines that no adjustment to the new hotspot area is to be performed ("no" at decision block 506), the process 500 may proceed directly to block 512. At block 512, the geolocation engine 102 may determine that an identification of the new hotspot area is complete. Subsequently, the geolocation engine 102 may store the identification information for the new hotspot area in the data store 222.

At decision block 514, the geolocation engine 102 may determine whether to predict future hotspot areas. The determination may be made based on an input from a user or a configuration setting of the geolocation engine 102. This, if the geolocation engine 102 determines that no prediction of the future hotspot areas is to be performed ("no" at decision block 514), the process 500 may loop back to block 502. However, if the geolocation engine 102 determines that prediction of the future hotspot areas is to be performed ("no" at decision block 514), the process 500 may proceed to block 516.

At block 516, the geolocation engine 102 may use a machine learning function to predict when a new hotspot area is to be implemented to prevent further wireless communication traffic congestion. In various embodiments, the machine learning function may take into account short-term and/or long-term network traffic load and distribution trends in different geographical areas, as projected based on the geolocations of the user devices. External contextual information such as population growth, economic indexes, employment figures, traffic patterns, and/or so forth, may also be concurrently analyzed by the machine learning function to make the predictions.

The techniques for employing machine learning to pinpoint the locations of user devices may provide more accurate user device geolocations than conventional geolocation practices used by wireless communication carriers. Further, through the use of machine learning to pinpoint the location of a user device as described in the embodiments, the computation of the location may be achieved quicker and in a more simplistic manner than using other conventional geolocation algorithms. As cell sites become more densified over time in order to meet capacity demands, the ability to obtain highly accurate user device geolocations quickly may lead to precise identification of hotspot areas. In turn, the precise identification of hotspot areas may result in more effective deployment of new cell sites that alleviate localized telecommunication traffic congestions. Thus, techniques may reduce customer service support call volumes, increase customer satisfaction and retention, and generate higher revenue for wireless communication carriers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
    determining a coarse geolocation of a user device based on wireless communication network usage information of the user device;
    inputting device data into a trained geolocation model of a machine learning algorithm, the device data including the coarse geolocation of the user device;
    determining a refined geolocation of the user device that is more accurate than the coarse geolocation of the user device by using the machine learning algorithm to process the device data via the trained geolocation model; and
    storing the refined geolocation of the user device in a data store,
    wherein the machine learning algorithm includes at least one algorithm selected from the group consisting of a decision tree algorithm, a neural network algorithm, and a fuzzy logic algorithm, and
    wherein the trained geolocation model calculates respective probabilities that the user device is located in each of a plurality of predetermined geographic areas.

2. The one or more non-transitory computer-readable media of claim 1, wherein the acts further comprise training a geolocation model into the trained geolocation model based on training data, the training data including one or more data selected from the group consisting of mobile test data that includes at least one signal characteristic of telecommunication signals provided by a wireless communication carrier at known locations, access point data that includes identification information of access points and at least one signal characteristics of each access point, global positioning system (GPS) sample data including GPS ascertained locations and at least one signal characteristic of telecommunication signals at the GPS ascertained locations, and implicit location sample data that includes indirectly derived locations of user devices and at least one signal characteristic of telecommunication signals at the indirectly derived locations.

3. The one or more non-transitory computer-readable media of claim 2, wherein the training data is received from at least one source selected from the group consisting of a Serving Mobile Location Center (SMLC), an Access Network Discovery and Selection Function (ANDSF), a Hotspot 2.0 (HS2.0) server, and a telecommunication network performance metric collection server.

4. The one or more non-transitory computer-readable media of claim 2, wherein each signal characteristic is one of a signal strength or a signal quality.

5. The one or more non-transitory computer-readable media of claim 2, wherein the GPS sample data is collected by location-aware applications that reside on a plurality of user devices.

6. The one or more non-transitory computer-readable media of claim 2, wherein the indirectly derived locations include a location of an additional user device that is derived from a billing address of a user of the additional user device at a particular time.

7. The one or more non-transitory computer-readable media of claim 1, wherein the acts further comprise:
    determining that additional training data is available for further training the trained geolocation model prior to the inputting of the device data into the trained geolocation model; and
    performing additional training the trained geolocation model with the additional training data.

8. The one or more non-transitory computer-readable media of claim 1, wherein in the acts further comprise:
    determining a hotspot area based on the refined geolocation of the user device and at least one geolocation of one or more additional user devices, the hotspot area for deploying a network cell to alleviate a wireless communication traffic congestion in a geographical area that at least partially includes the hotspot area;
    ascertaining that an offload of the wireless communication traffic congestion to the hotspot area failed to meet a predetermined offload threshold; and
    in response to ascertaining that the offload of the wireless communication traffic congestion to the hotspot area failed to meet the predetermined offload threshold, adjusting at least one boundary of the hotspot area until the offload of the wireless communication traffic congestion to the hotspot area meets the predetermined offload threshold.

9. The one or more non-transitory computer-readable media of claim 8, further comprising creating one or more additional hotspot areas to compensate for the adjusting of the at least one boundary of the hotspot area.

10. The one or more non-transitory computer-readable media of claim 8, wherein the acts further comprise determining that the wireless communication traffic congestion is occurring in the geographical area based on wireless communication data, the wireless communication data including at least one of Operation Support System (OSS) reports, cell trace data, and Internet Protocol (IP) network performance metrics.

11. The one or more non-transitory computer-readable media of claim 8, wherein the device data further includes at least one selected from the group consisting of a time of day, at least one signal characteristic of a communication signal of the user device received by a network cell, and interference to the network cell from at least one nearby network cell.

12. The one or more non-transitory computer-readable media of claim 8, wherein the network cell is a macrocell, a picocell, a femtocell, or a microcell.

13. The one or more non-transitory computer-readable media claim 1, wherein in the acts further comprise:
    determining a hotspot area based on the refined geolocation and at least one geolocation of one or more additional user devices, the hotspot area for deploying a network cell to alleviate a wireless communication traffic congestion in a geographical area that at least partially includes the hotspot area;
    ascertaining that the deploying of the network cell causes radio frequency (RF) interference with an existing network cell; and
    adjusting at least one boundary of the hotspot area until the RF interference is eliminated or is reduced to an acceptable level.

14. A computing device, comprising:
    one or more processors; and memory including a plurality of computer-executable components that are executable by the one or more processors to perform a plurality of actions, the plurality of actions comprising:
- training a geolocation model of a machine learning algorithm to locate user devices;
- obtaining a geolocation of a user device by using the machine learning algorithm to process inputted device data of the user device via the geolocation model;
- determining a hotspot area based on the geolocation of the user device and at least one geolocation of one or more additional user devices, the hotspot area for deploying a network cell to alleviate a wireless communication traffic congestion in a geographical area that at least partially includes the hotspot area;
- ascertaining whether an offload of the wireless communication traffic congestion to the hotspot area meets a predetermined offload threshold;
- adjusting at least one boundary of the hotspot area in response to ascertaining that the offload fails to meet the predetermined offload threshold; and
- determining that an identification of the hotspot area is completed in response to ascertaining that the offload meets the predetermined offload threshold.

15. The computing device of claim 14, further comprising in response to at least one boundary of the hotspot area being adjusted, creating one or more additional hotspot areas to compensate for the adjusting of the at least one boundary of the hotspot area.

16. The computing device of claim 14, further comprising:
- ascertaining that the wireless communication traffic congestion is a non-transient wireless communication traffic congestion based on contextual information and historical wireless communication traffic patterns; and
- determining that a cause of the non-transient wireless communication traffic congestion is unrelated to a network infrastructure error,
- wherein the determining the hotspot area includes determining the hotspot area based on the geolocation of the user device and at least one geolocation of one or more additional user devices in response to the cause of the non-transient wireless communication traffic congestion being unrelated to the network infrastructure error.

17. The computing device of claim 16, wherein the network infrastructure error is caused by an equipment failure, radio signal interference, a hardware configuration error, or a software configuration error that affects a wireless communication network.

18. The computing device of claim 16, further comprising:
- determining that an additional non-transient wireless communication traffic congestion is caused by a network infrastructure error; and
- sending an alert regarding the network infrastructure error to an software application of a wireless communication network affected by the non-transient wireless communication traffic congestion.

19. The computing device of claim 14, wherein the obtaining the geolocation of the user device includes:
- determining whether the user device affected by the wireless communication traffic congestion is located indoors or outdoors;
- determining a geolocation of the user device by using the machine learning algorithm to process network access data of the user device via the geolocation model in response to the user device being located outdoors, the network access data including one or more data selected from the group consisting of a time of day, at least one signal characteristic of a communication signal of the user device received by a network cell, and interference to the network cell from at least one nearby network cell; and
- determining the geolocation of the user device by using the machine learning algorithm to process the network access data and access point connectivity data of the user device via the geolocation model in response to the user device being located indoors, the access point connectivity data including one or more data selected from the group consisting of connectivity date and time, at least one signal characteristic of a telecommunication signal from the user device received by an access point, and a location of the access point.

20. The computing device of claim 14, wherein the determining whether the user device affected is located indoors or outdoors includes determining that the user device is indoors in response to one or more conditions selected from the group consisting of a signal strength or signal quality of a telecommunication signal received from the user device being below a corresponding threshold, a frequency of a switch over between two cell sites by the user device being higher than a predetermined switch over frequency threshold, and a presence of access point connectivity by the user device in a recent time period that lasts for than a predetermined time interval.

21. A computer-implemented method, comprising:
- determining whether a user device affected by a non-transient wireless communication congestion is located indoors or outdoors;
- determining a geolocation of the user device by using a machine learning algorithm to process network access data of the user device via a trained geolocation model in response to the user device being located outdoors; and
- determining the geolocation of the user device by using the machine learning algorithm to process the network access data and access point connectivity data of the user device via the trained geolocation model in response to the user device being located indoors;
- ascertaining a hotspot area based on the geolocation of the user device and at least one geolocation of one or more additional user devices, the hotspot area for deploying a network cell to alleviate a wireless communication traffic congestion in a geographical area that at least partially includes the hotspot area;
- ascertaining whether an offload of the wireless communication traffic congestion to the hotspot area meets a predetermined offload threshold;
- adjusting at least one boundary of the hotspot area in response to ascertaining that the offload fails to meet the predetermined offload threshold; and
- determining that an identification of the hotspot area is completed in response to ascertaining that the offload meets the predetermined offload threshold.

22. The computer-implemented method of claim 21, further comprising using a machine learning function to predict a time for implementing a new hotspot area based at least on the geolocation of the user device and at least one geolocation of one or more additional user devices and external contextual information.

23. The computer-implemented method of claim 21, wherein the network access data includes one or more selected from the group consisting of a time of day, at least one signal characteristic of a communication signal of the user device received by a network cell, and interference to the network cell from at least one nearby network cell, and wherein the access point connectivity data includes one or more of connectivity date and time, at least one signal characteristic of a telecommunication signal from the user device received by an access point, or a location of the access point.

24. The one or more non-transitory computer-readable media of claim 1, wherein the acts further comprise:
   predicting, using a machine-learning-based analysis of contextual information, the refined geolocation of the user device, and at least one geolocation of one or more additional user devices, a predicted hotspot area for deploying a network cell to alleviate a projected wireless communication traffic congestion in a geographical area that at least partially includes the hotspot area,
   wherein the contextual information includes one or more information selected from the group consisting of network traffic load trend information, network traffic distribution trend information, population growth information, economic index information, employment information, and traffic pattern information.

* * * * *